(12) United States Patent
Heo et al.

(10) Patent No.: US 10,423,660 B1
(45) Date of Patent: Sep. 24, 2019

(54) SYSTEM FOR DETECTING NON-SYNCHRONIZATION BETWEEN AUDIO AND SUBTITLE

(71) Applicant: Amazon Technologies, Inc., Seattle, WA (US)

(72) Inventors: Donghyeok Heo, Los Angeles, CA (US); Hooman Mahyar, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 29 days.

(21) Appl. No.: 15/835,256

(22) Filed: Dec. 7, 2017

(51) Int. Cl.
*G06F 17/30* (2006.01)
*G10L 15/26* (2006.01)
*G06F 16/68* (2019.01)
*H04N 21/488* (2011.01)
*G06F 16/30* (2019.01)

(52) U.S. Cl.
CPC ............ *G06F 16/686* (2019.01); *G06F 16/30* (2019.01); *G10L 15/265* (2013.01); *H04N 21/4884* (2013.01)

(58) Field of Classification Search
CPC ......... G06F 17/30; G06F 17/00; G10L 15/26; H04N 21/488
USPC .................................. 700/94; 381/119, 73.1
See application file for complete search history.

(56) References Cited

U.S. PATENT DOCUMENTS

2011/0181775 A1* 7/2011 Canova ............ H04N 21/23614
348/512
2015/0310107 A1* 10/2015 Alhakimi ................ G06F 16/41
707/711

* cited by examiner

*Primary Examiner* — Melur Ramakrishnaiah
(74) *Attorney, Agent, or Firm* — Kilpatrick Townsend & Stockton LLP

(57) ABSTRACT

Techniques for identifying and correcting synchronization errors between audio and subtitles for media content are described herein. For example, a portion of a subtitle file associated with media content may be extracted based on subtitle cues included in the portion of the subtitle file. In embodiments, an audio to text file may be generated from the extracted portion using a speech to text algorithm. A detected subtitle text file may be generated using the subtitle file, the audio to text file, and an edit distance algorithm. In embodiments, one or more synchronization errors between the audio and subtitles for the media content may be identified based on time stamp information associated with the audio to text file and a subtitle cue for the extracted portion of the subtitle file.

20 Claims, 8 Drawing Sheets

SYSTEM FOR DETECTING NON-SYNCHRONIZATION BETWEEN AUDIO AND SUBTITLE

BACKGROUND

Current media content usually includes subtitles to aid hard of hearing or deaf people in enjoying the content. Some users utilize subtitles when attempting to consume media content in a noisy environment or they rely on the subtitles to help overcome language barriers. However, some media content contains synchronization errors between the audio of the media content and the timing of when the corresponding subtitles are presented. This can ruin the immersion of the viewer, lead to users taking longer to consume the content as they have to keep re-watching certain portions, or frustrate the user into not finishing the content all together. Conventional methods of identifying synchronization errors rely on manual input from users and correcting the errors once identified can be inefficient as they are also manually implemented.

BRIEF DESCRIPTION OF THE DRAWINGS

Various embodiments in accordance with the present disclosure will be described with reference to the drawings, in which.

DETAILED DESCRIPTION

Figure 1:
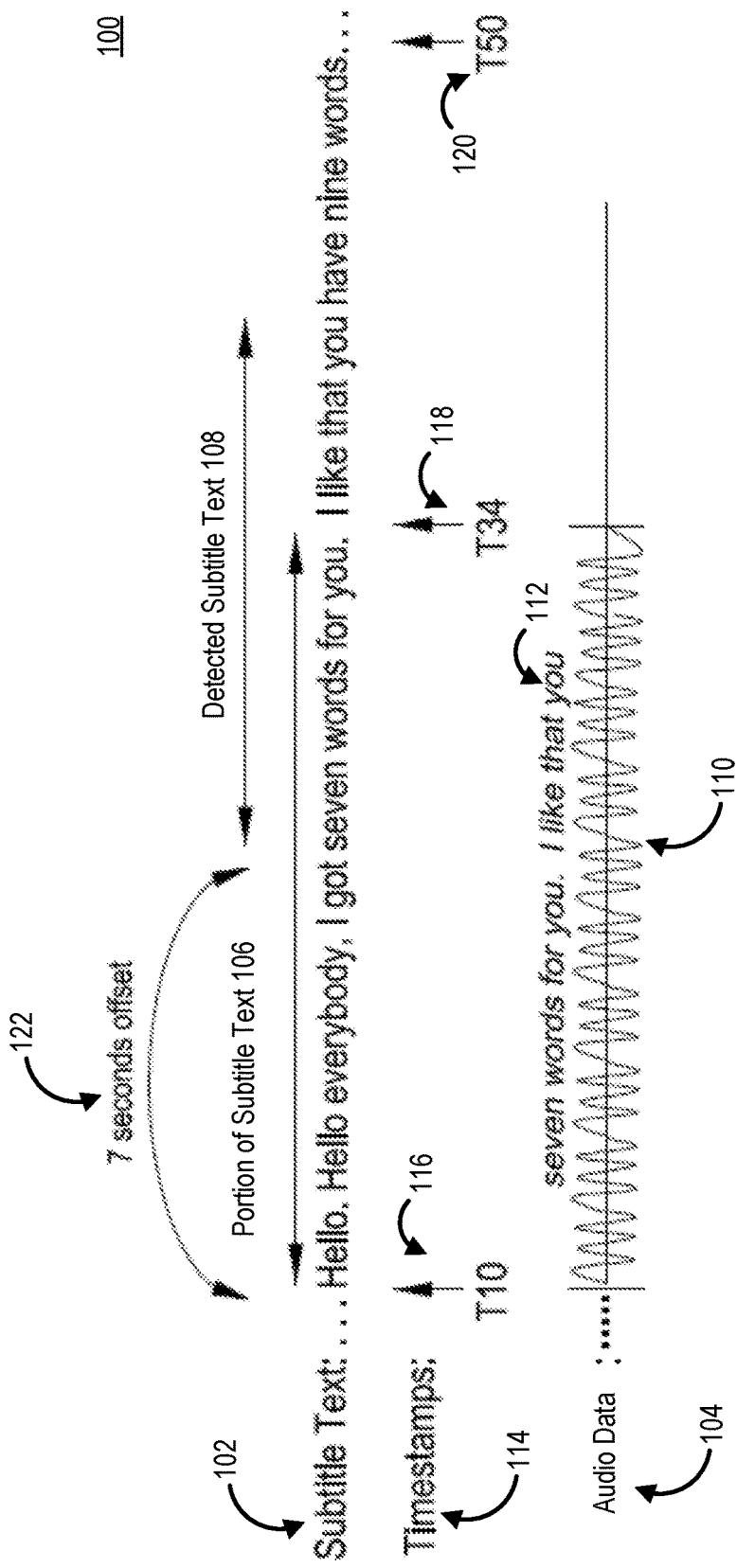
FIG. 1 illustrates an example synchronization error between subtitle text and audio data for media content identified in a synchronization identification feature implemented by a service computer, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide a synchronization identification feature for identifying and correcting synchronization errors between audio and corresponding subtitles for media content. For example, a service provider computer implementing the synchronization identification feature may utilize a subtitle file associated with media content to identify one or more synchronization errors between the text included in the subtitle file and the corresponding audio of the media content. In embodiments, the service provider computer may automatically correct the identified synchronization errors by modifying or otherwise updating metadata of the subtitle file thereby adjusting the start and end times that subtitles are presented and resolving any offset or out-of-synch error between the subtitles and audio for the media content. In accordance with at least one embodiment, the service provider computer may generate a report identifying some synchronization errors that can be resolved via other means than modifying the metadata of the subtitle file. For example, certain classifications of errors may require manual input or further investigation to resolve the issues presented by the errors.

In accordance with at least one embodiment, the synchronization identification feature may parse or otherwise generate a given subtitle file into an object oriented data structure, such as a JAVA data structure. In some embodiments, the object oriented data structure may be an agnostic object oriented data structure. The object oriented data structure may be utilized by the service provider computer and synchronization identification feature to select and extract certain portions of the subtitle file for identifying and correcting synchronization errors of media content. In embodiments, the synchronization identification feature may include an audio extractor that is implemented by a module associated or further implemented by the service provider computer. The audio extractor may selected certain portions or audio snippets that will be processed and checked for synchronization errors. The subtitle file may be divided into a certain number of proportionate intervals. For example, the subtitle file may be divided into fifteen proportionate intervals. In accordance with at least one embodiment, a subtitle file may include information that identifies text that is displayed with corresponding audio during presentation of media content as well as subtitle cues that indicate a start time and end time for when the corresponding text is to display as well as cease displaying. In embodiments, the audio extractor may select the certain portions or audio snippets based on a length of the characters included in the subtitle cue as well as the duration of the subtitle cue. For example, an optimal character length of a subtitle may include 200 characters whereas an optimal duration for a subtitle cue may include a subtitle cue that exceeds fifteen seconds.

Once the portions or audio snippets have been selected from the subtitle file, the service provider computers may utilize a speech to text algorithm that generates an audio to text file. The audio to text file comprises a text format file generated from the conversion of the audio in the portions/audio snippets by the speech to text algorithm into text. The speech to text algorithm may include conventional speech to text algorithms and need not be expanded on in the disclosure. In embodiments, the audio to text file may include the words detected by the algorithm, as well as information that identifies a confidence in the detected word, and time stamp/time points, or time information that identifies, in time, when the word was first detected and when the word was no longer detected by the algorithm within the audio snippet/portion. In accordance with at least one embodiment, the synchronization identification features include identifying a section of subtitle text within the subtitle file that is most similar to the speech to text output included in the audio to text file. In embodiments, the subtitle text may be parsed into a plurality of substrings of length equal to a length, in characters, of the characters included in a given audio snippet or portion within the audio to text file. For example, if a portion includes one or more words of character length 36, the subtitle file may be combined into one string that is subsequently parsed into substrings of length 36. In accordance with at least one embodiment, an edit distance algorithm may identify the section of subtitle text that is most similar to the audio snippet or portion identified by the speech to text algorithm by identifying the smallest number of operations to convert one string into the other compared string. The identified or selected section of subtitle text may be referred to as detected subtitle text and be stored in a detected subtitle text file.

In accordance with at least one embodiment, the service provider computers may utilize the subtitles and corresponding time information/time points/time stamp information of the audio to text file to compare to the time information/time points/time stamp information of the detected subtitle text file to identify one or more synchronization errors. For example, the service provider computers can identify an offset in the synchronization between the two files by comparing the corresponding time information of both files for similar words as the time information represents when the audio is presented, via the audio to text file, of the media content and when the corresponding subtitles are presented for the media content. If the audio and subtitles are synchronized then no difference will be identified between the time information. However, if a synchronization error is present within the media content and subtitle file, a time lapse or difference between the two files can be identified and corrected. As an illustrative use case, a service provider computer may process media content, such as a movie, to identify synchronization errors between the subtitles and audio for the movie. The service provider computer may extract or otherwise obtain the subtitle file for the movie and generate the object oriented data object that is utilized to identify the synchronization errors. Once the audio snippets or portions of the subtitle file have been extracted and selected, the service provider computer may utilize a speech to text algorithm to generate the audio to text file. Thereafter, the similar sections of the subtitle file can be found using an edit distance algorithm to generate the detected subtitle text file which is then compared with the audio to text file to identify any synchronization errors. If any synchronization errors are identified, the service provider computer may classify the error into one or more categories or classifications and then attempt to automatically correct the errors by modifying or otherwise updating the metadata of the subtitle file or the subtitle file itself. In embodiments, a report of any identified errors as well as corrective measures may be generated and associated with the movie.

The processes and systems described herein may be an improvement on conventional synchronization error and correction methods for out-of-synch media content. For example, conventional methods for identifying and correcting synchronization errors include manually identifying or relying in input from users to identify any synchronization errors subsequent to consuming the media content which can ruin the experience and be a time consuming process. Further, conventional correction methods may include manually correcting out-of-synch errors, reporting issues to other entities such as producers of the content to fix, or other time inefficient solutions. The methods and systems described herein provide for more efficient and automatic identification and correction of synchronization errors between audio and subtitles for media content. For example, the service provider computers implementing the synchronization identification features described herein can automatically process and identify the synchronization errors absent any user input and prior to consumption by users. This can reduce the time to identify and correct errors as well as maintain the immersion and enjoyment of users who are consuming the content. Further, computer resource utilization savings can be achieved via the methods and systems described herein as conventional methods of processing audio or subtitle text can be resource and time consuming. For example, conventional methods of processing subtitles for identifying errors involve analyzing the entire length of the subtitles and audio to identify errors which can take as much as four minutes per computer processing unit for every one minute of audio for media content. However, the methods and systems described herein utilize an identification and correction process that only checks or identifies errors within certain portions of the subtitle file as errors and correction procedures for correcting the identified errors can be applied globally to the subtitle file to re-synchronize the audio and subtitle of the media content.

FIG. 1 illustrates an example synchronization error between subtitle text and audio data for media content identified in a synchronization identification feature implemented by a service computer, in accordance with at least one embodiment. The diagram 100 of FIG. 1 includes a comparison of subtitle text 102 to audio data 104. The subtitle text 102 further includes a portion of subtitle text 106 and a detected subtitle text 108. As described herein, the portion of subtitle text includes an audio snippet or portion of the entire subtitle text that was selected or extracted according to the synchronization identification feature based on subtitle cues character length and duration. In embodiments, the detected subtitle text 108 represents the string of text within a subtitle cue of the subtitle file that most closely resembles the text of the audio to text file according to the edit distance algorithm. In FIG. 1, the text of the detected subtitle text 108 includes "seven words for you. I like that you." FIG. 1 also includes audio data 104 represented by a sound wave 110 along with corresponding text 112.

The audio data 104 includes an illustrative example of the data included in an audio to text file discussed herein. FIG. 1 also includes time information 114 referred to as "Timestamps" as well as several time points 116, 118, and 120. As illustrated in FIG. 1 the audio data 104 includes one or more words presented in media content at time point 116 until time point 118 representing 24 seconds of time passing between the beginning of the detected audio and the ceasing of detecting audio for this portion of the audio data 104. The subtitle text 102 includes a portion of the subtitle text 106 that begins at time point 116 that does not match the detected subtitle text 108. Instead, there exists an offset 122 of seven seconds between the detected audio of the words "seven words for you. I like that you," and the detected subtitle text 108 of the subtitle text 102. As such, FIG. 1 illustrates an identification of a synchronization error between the subtitle text 102 of a given media content and the audio data 104 for the media content. FIG. 1 illustrates an example offset classification synchronization error for a portion of the subtitle an audio for a given media content. The synchronization identification feature may perform a similar identification and correction procedure for multiple audio snippets or portions of the subtitle text and audio for a given media content to verify synchronization errors and correct them.

Figure 2:
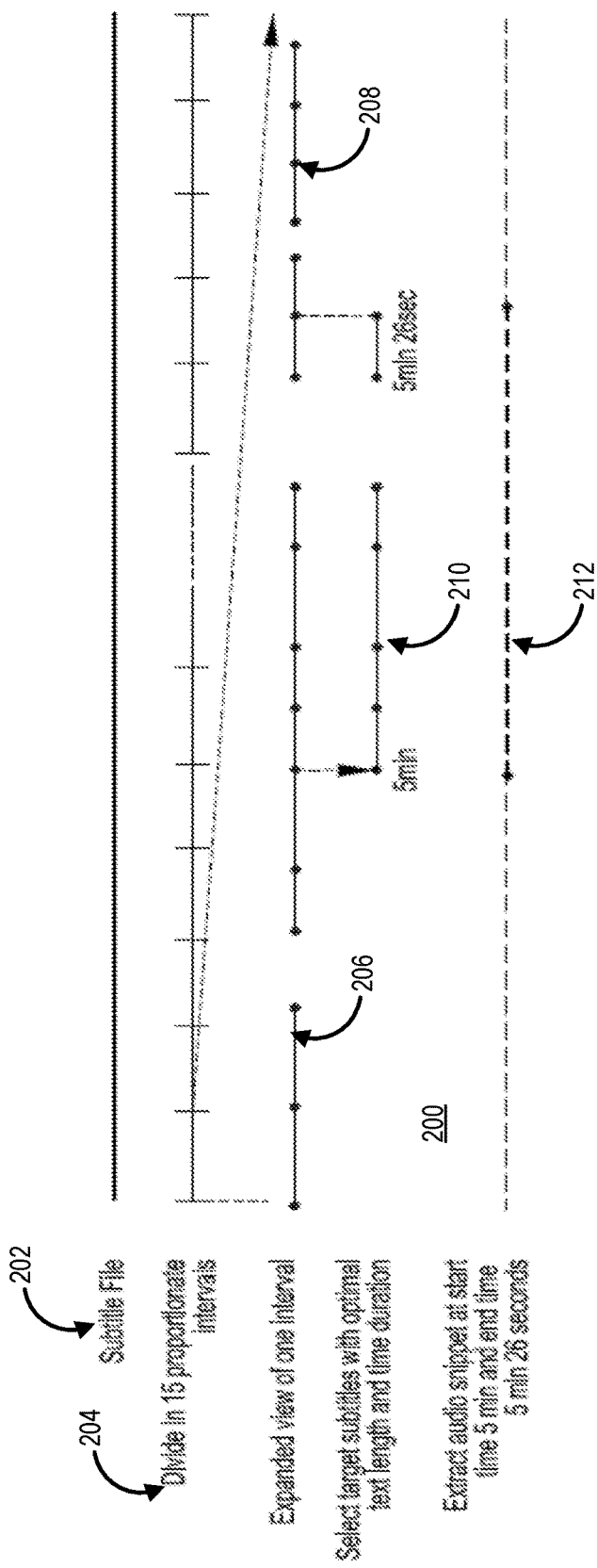
FIG. 2 illustrates an example audio portion that is selected for extraction by a synchronization identification feature implemented by a service computer, in accordance with at least one embodiment.

FIG. 2 illustrates an example audio portion that is selected for extraction by a synchronization identification feature implemented by a service computer, in accordance with at least one embodiment. The diagram 200 of FIG. 2 includes several representations of a subtitle file 202 in a process that illustrates an example for selecting and extracting an audio snippet or portion of the subtitle file for identifying synchronization errors according to the synchronization identification features described herein. In FIG. 2, the process may include dividing the subtitle file into a plurality of proportionate intervals 204. In FIG. 2, the subtitle file is parsed or divided into 15 proportionate intervals. FIG. 2 also depicts an expanded view 206 of one interval from 204. The expanded view interval 206 may include one or more subtitle cues 208 represented by solid black circles along the line of the expanded view 206 of one interval from 204.

As described herein, the subtitle cues 208 may include information that identifies when and what text is presented in a subtitle and when the text ceases to be presented for given media content. In accordance with at least one embodiment, an audio snippet or portion of the subtitle text 210 may be extracted 212 based on a text length and duration of the subtitles included in a given proportionate interval 206. In FIG. 2, the selected target subtitle has a duration of 26 seconds as the subtitle cues indicate that the audio snippet presents subtitles from 5 minutes to 5 minutes and 26 seconds for media content such as a movie or television series. The extracted audio snippet 212 that is of a duration of 26 seconds may be utilized in the synchronization identification feature for processing via a speech to text algorithm to generate an audio to text file that converts audio to text using the given audio portion that matches the audio snippet or portion 210 and 212 of FIG. 2.

Figure 3:
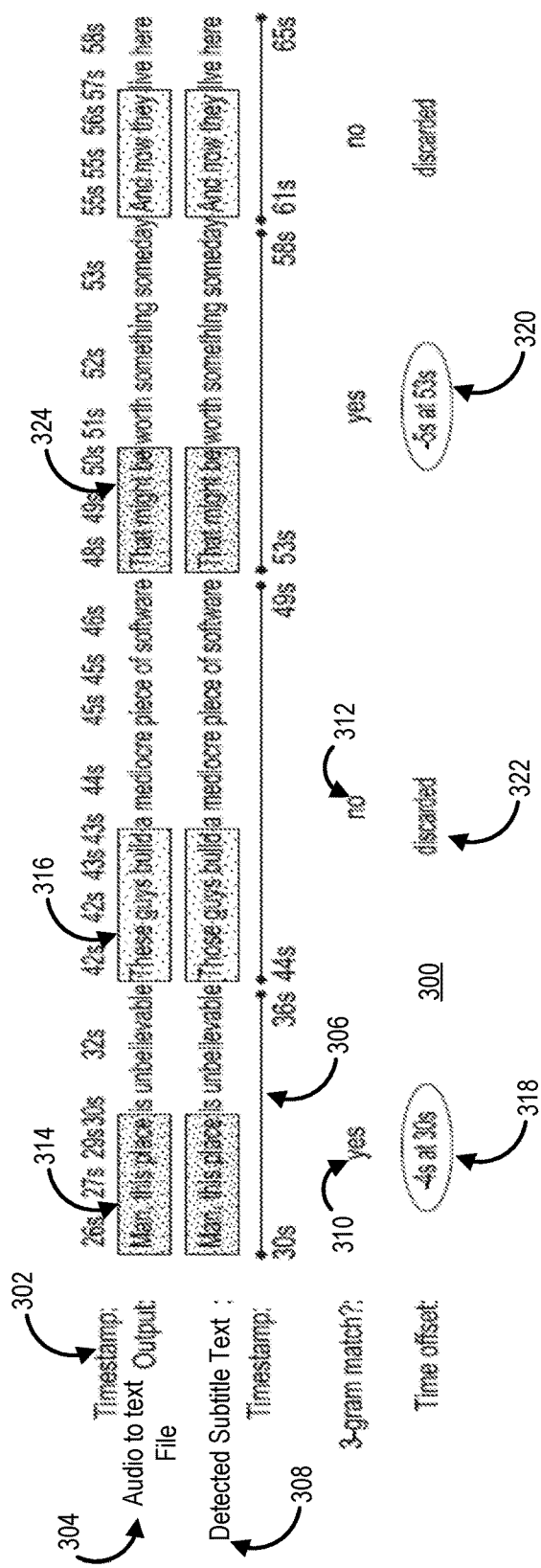
FIG. 3 illustrates an example identification of an offset synchronization error between audio and subtitles for media content by a synchronization identification feature implemented by a service computer, in accordance with at least one embodiment.

FIG. 3 illustrates an example identification of an offset synchronization error between audio and subtitles for media content by a synchronization identification feature implemented by a service computer, in accordance with at least one embodiment. The diagram 300 of FIG. 3 includes a comparison of timestamp or time information 302 of the audio to text output 304, from an audio to text file, and timestamp or time information 306 of detected subtitle text 308, from a detected subtitle text file. The two text files 304 and 308 are compared and the time information 302 and 306 are utilized to identify an synchronization errors. FIG. 3 also illustrates a certain number of matching words 310 or non-matching words 312 that are utilized throughout the comparison of the two text files 304 and 308 for use in the synchronization error identification process. For example, FIG. 3 depicts a 3-gram match comparison indicating that the synchronization identification feature requires a minimum of 3 matching words between the text file 304 and 308 in order to be utilized for identifying synchronization errors.

FIG. 3 depicts a match at 314 between the text of 304 and 308 with the words "Man, this place," and also depicts a mismatch at 316 between the words "These guys build" of text file 304 versus "Those guys build" of text file 308. In accordance with at least one embodiment, the synchronization identification feature utilizes only the matched portions of the two strings and their corresponding timestamp or time information to identify errors within the comparison of the two text files 304 and 308 and ignores any mismatched portions or data gathered from the mismatched portions of the two text files 304 and 308. In embodiments, an administrator associated with the service provider computers implementing the synchronization identification features can specify the number of matching words or certain number gram match comparison required to utilize any data gathered from those portions of corresponding stings to allow for more stringent or less stringent data gathering points for the subtitle files. FIG. 3 depicts several time offsets detected between the timestamp or time information between the two text files 304 and 308 at 318 and 320 as well as a data discarded indication at 322. As illustrated in FIG. 3, the time offset at 318 indicates that there is a difference of four seconds between the detected subtitle text 308 at 30 seconds in and the audio to text file output 304 which is presenting audio at the 26 second mark (314). Another offset synchronization error is depicts at 320 indicating that there is a five second difference at the 53 second mark of the detected subtitle text 308 and the audio to text file output 304 at the 48 second mark (324). As described above, the time difference data at 316 between the text files 304 and 308 is ignored as the words for both text files do not meet the minimum requirement of three matching words for consideration in the synchronization identification algorithm. The systems and methods described herein utilize the minimum matching words variable to quickly parse through the data and identify any synchronization errors without having to match each word portion of the text files 304 and 308 thereby still capturing the synchronization errors in a more efficient and less computationally expensive manner.

Figure 4:
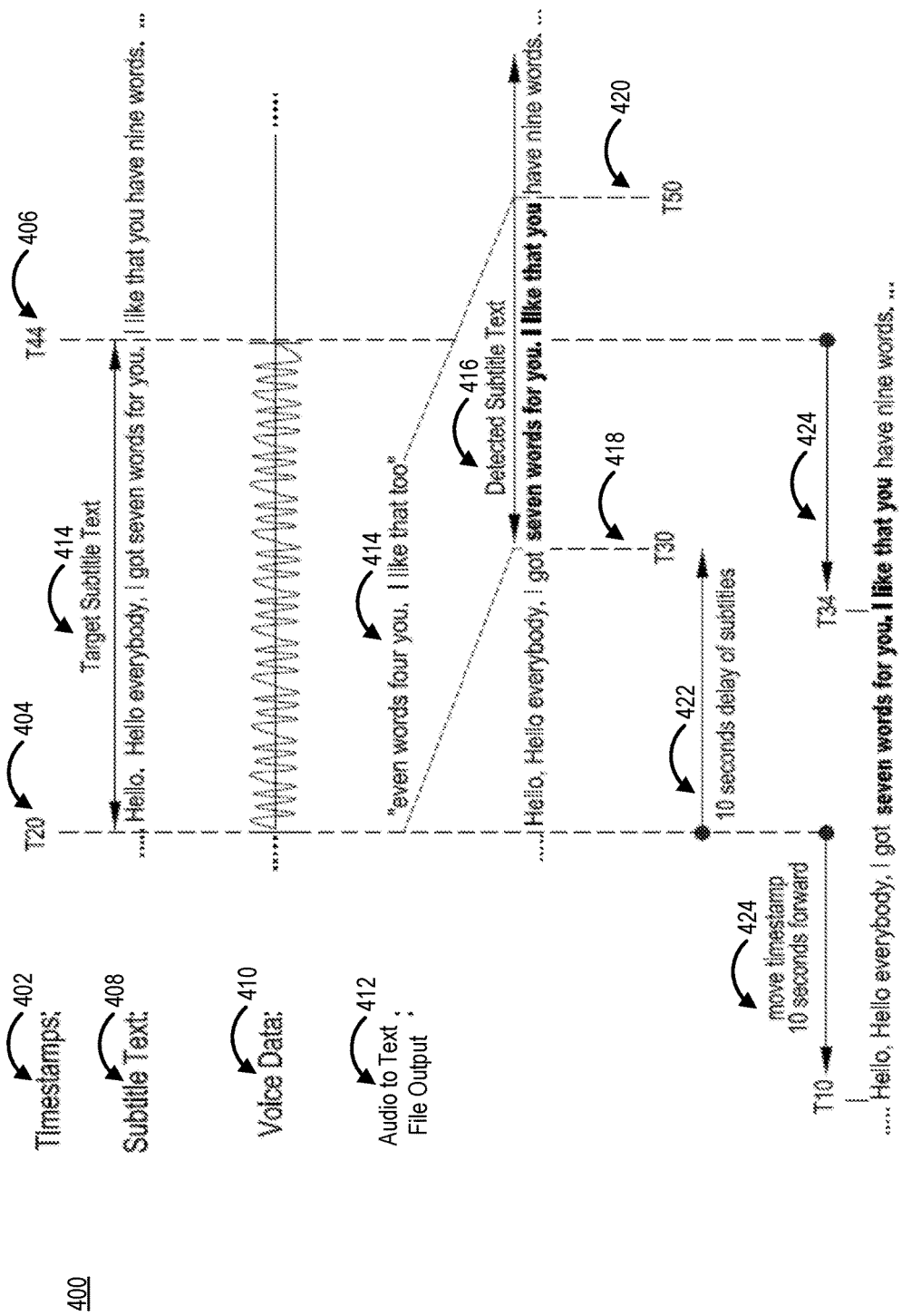
FIG. 4 illustrates an example workflow for an identification and correction of an offset synchronization error between audio and subtitles for media content by a synchronization identification feature implemented by a service computer, in accordance with at least one embodiment.

FIG. 4 illustrates an example workflow for an identification and correction of an offset synchronization error between audio and subtitles for media content by a synchronization identification feature implemented by a service computer, in accordance with at least one embodiment. The workflow 400 of FIG. 4 depicts several steps as well as comparison information that illustrate the synchronization identification features described herein. For example, the workflow 400 includes the timestamps or time information 402 that corresponds to two time points 404 and 406 for subtitle text 408 and voice data 410. The workflow 400 also depicts the audio to text file output 412. In accordance with at least one embodiment, a portion or audio snippet 414 (indicated by the target subtitle text of FIG. 4) is selected based on the corresponding subtitle text and duration of the subtitles as indicated by the associated subtitle cues for the portion or audio snippet 414. In embodiments, the subtitle file associated with the subtitle text 408 may be generated into an object oriented data object for use by the service provider computer in identifying synchronization errors.

The workflow 400 depicts the voice data 410 that corresponds to the audio portion of the subtitle text 408. In accordance with at least one embodiment, the service provider computer may utilize this portion of audio (voice data 410) in a speech to text algorithm to generate the audio to text file output 412. In embodiments, the speech to text algorithm can convert the audio of the voice data 410 into the text 414 of the audio to text file output 412. In accordance with at least one embodiment, the workflow 400 can identifying the detected subtitle text 416 that represents a similar match between the string of the audio to text file output 412 with the subtitle text 408 and 414 using an edit distance algorithm. As described herein, the edit distance algorithm may parse the entire subtitle file into substring partitions of character length equal to the audio to text file output 412 character length and identify a substring that is the most similar to the audio to text file output resulting in the detected subtitle text 416.

FIG. 4 also illustrates a comparison of the timestamps 402 for the audio to text file output 412 and the timestamps 418 and 420 of the detected subtitle text 416 based on a match between a certain number of words between 414 and 416. In embodiments, a 3-gram comparison may be utilized such that only text strings who have at a minimum least three words similar may be used to identify synchronization errors. In the workflow 400, an identification of a ten second delay of the presentation of the subtitles 422 is identified as a ten second difference is detected between the timestamp 402 and 404 for the audio to text file output 412 and the timestamp 418 of the detected subtitle text 416 (e.g., T20 of 404 compared to T30 of 418). In response to identifying the ten second synchronization error between the audio to text file output 412 and the detected subtitle text 416, the service provider computer may automatically correct the synchronization error by modifying the subtitle file such that the timestamp 404 is moved 424 ten seconds forward. In embodiments, the movement of the timestamp 404 to 424 can be achieved by manipulating the data object for the subtitle file and/or modifying or updating metadata associated with the subtitle file such that the timestamp is appropriately modified to reflect a correction to the synchronization error. In accordance with at least one embodiment, the service provider computer may classify any synchronization errors identified when comparing the text files of 412 and 416 as well as the corresponding time information into one or more classifications. The classifications may be used by the service provider computer to generate reports identifying the errors or for taking the appropriate steps to correct the errors. For example, a classification of a drift synchronization error may result in modifying of the timestamp information for the entire subtitle file by a certain amount of time to correct the error.

Figure 5:
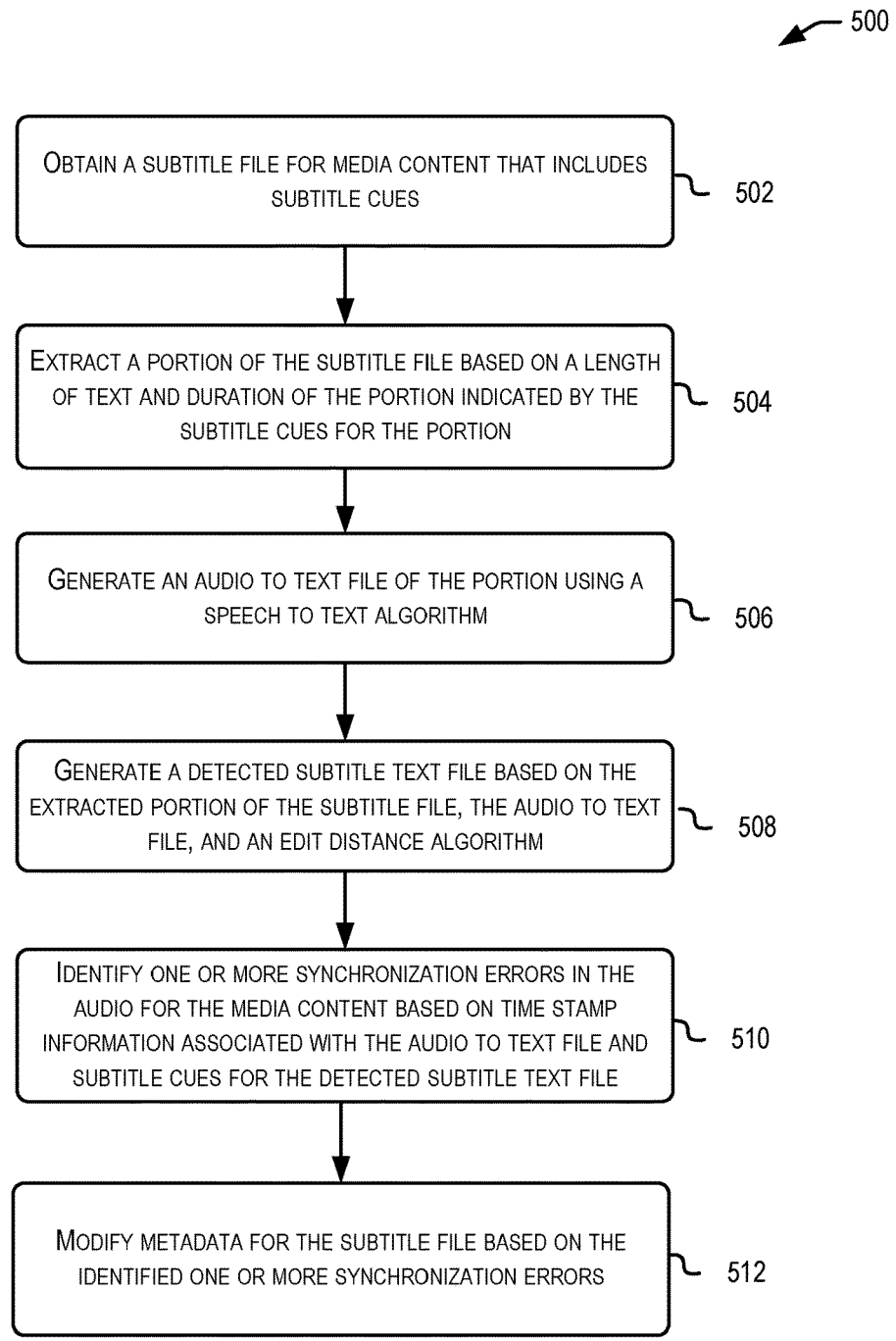
FIG. 5 illustrates an example flow chart for a synchronization identification feature, in accordance with at least one embodiment.
Figure 6:
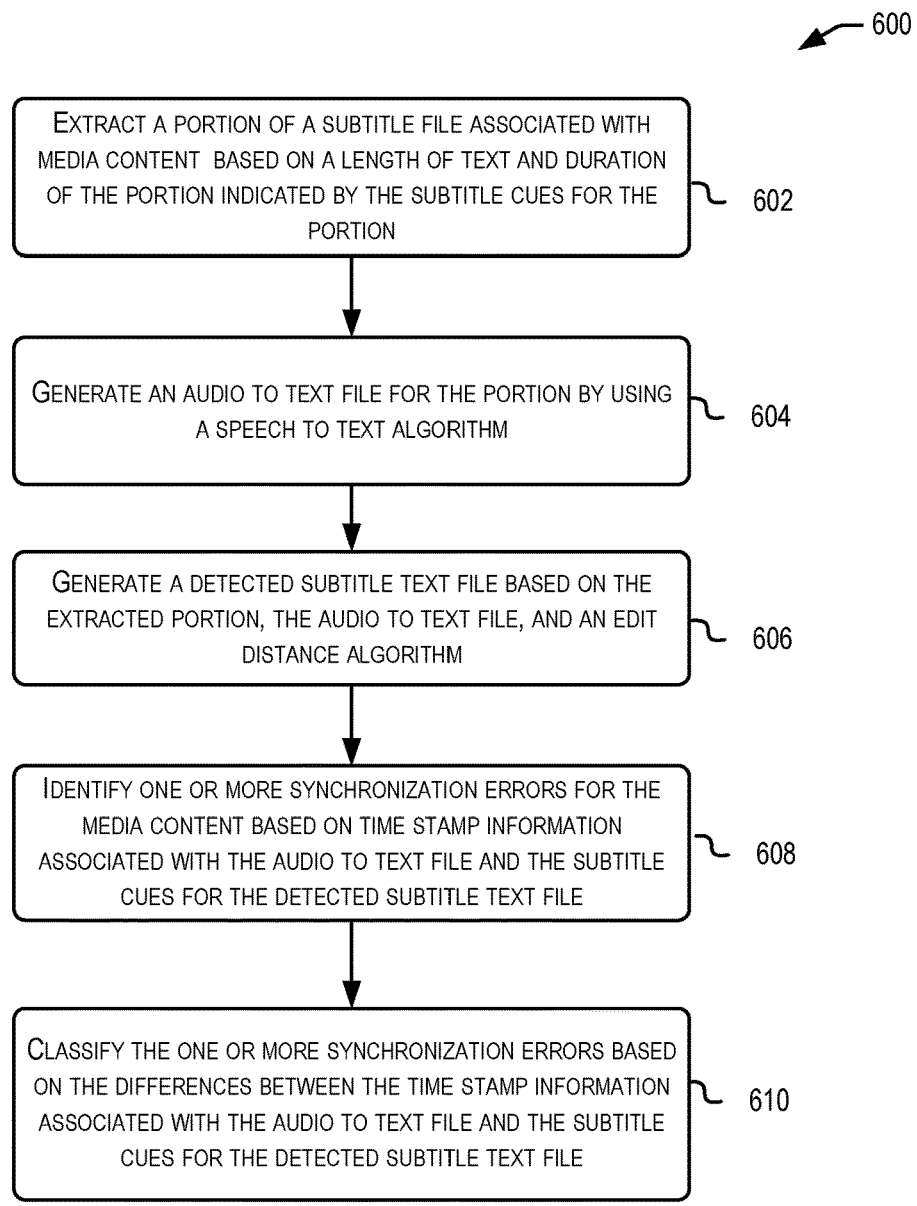
FIG. 6 illustrates an example flow chart for a synchronization identification feature, in accordance with at least one embodiment.

FIGS. 5 and 6 illustrate example flow charts for synchronization identification features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combination thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

Figure 7:
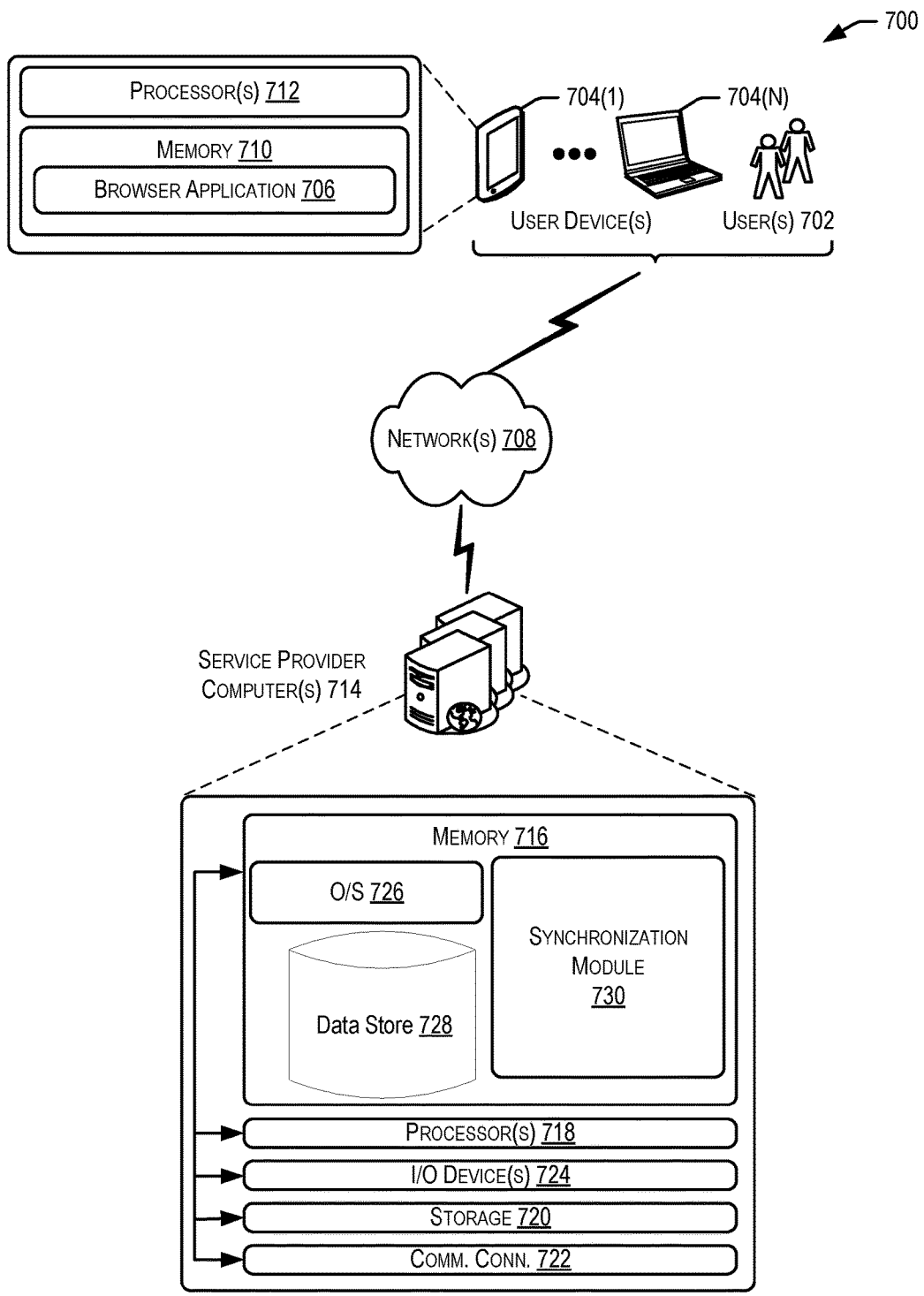
FIG. 7 illustrates an example architecture for implementing the synchronization identification feature, in accordance with at least one embodiment.

In some examples, service provider computers (service provider computers 714) utilizing at least the synchronization module 730 depicted in FIG. 7 may perform the processes 500 and 600 of FIGS. 5 and 6. In FIG. 5, the process 500 may include obtaining a subtitle file for media content that includes subtitle cues at 502. For example, the service provider computers may receive or obtain subtitle files for a number of movie titles, TV shows, or other media content. The subtitle file may be parsed, modified, or transformed from a first data type and/or data structure to an object oriented data structure. The object oriented data structure may be an agnostic object oriented data structure. The process 500 may include extracting a portion of the subtitle file based on a length of text and duration of the portion that is indicated by the subtitle cues for the portion at 504. For example, the subtitle cues may include information that identifies the text that will be displayed when the subtitle is cued, a duration of the text or characters that are displayed when cued, as well as time information that indicates how far or at what time point of the media content the cue begins to display to correspond to audio as well as when it ceases to display. In embodiments, an administrator associated with the service provider computers that implement the synchronization identification features may specify the length of text and duration of the subtitle file that is appropriate or optimal for identifying synchronization errors. For example, an optimal length of text or characters for a subtitle file portion may be 200 or more characters and an optimal duration may be longer than fifteen seconds.

The process 500 may include generating an audio to text file of the extracted portion using a speech to text algorithm at 506. In embodiments, the synchronization module 730 may use the audio that corresponds to the extracted portion with a speech to text algorithm to convert the audio to a text format. The text format may be saved as an audio to text file and include information such as the word detected, the confidence in the word detected as represented by a numerical value, and the time stamp information or information that identifies the time that the word is detected including a start time and end time of the duration of the spoken word. The process 500 may include generating a detected subtitle text file based on the extracted portion of the subtitle file, the audio to text file, and an edit distance algorithm at 508. In accordance with at least one embodiment, the synchronization module 730 may identify a match between the text from the audio to text file and the subtitle text by using the edit distance algorithm. The edit distance algorithm identifies the least number of character changes or operations required to make one string a match for another string. The subtitle text of the subtitle file may be combined into one large string and then parsed into portions of size that are equal character length to the text portion being analyzed in the audio to text file for comparison and edit distance algorithm computation. For example, if the text of the audio to text file is of a length of 36 characters, the subtitle file text will be parsed into substrings of 36 characters which are then matched and analyzed using the edit distance algorithm to find the closest two strings that require the fewest operations to match the strings.

The process 500 may include identifying one or more synchronization errors in the audio for the media content based on time stamp information associated with the audio to text file and subtitle cues for the detected subtitle text file at 510. In embodiments, the synchronization module 730 may compare the start time of each detected subtitle cue within the detected subtitle text file to the start time of the correspond words in the audio to text file to find the offset for each associated subtitle cue. In some embodiments, a minimal matching comparison is used. For example, a certain number of words between the two strings for each subtitle cue will need to match in order to be utilized for the identification of the synchronization errors. To continue the example, a three gram or three word comparison may be utilized to identify a subtitle cue comparison that is appropriate for identifying an offset synchronization error. In embodiments, portions of the strings that do not include the minimal matching comparison are not utilized as data points when identifying the one or more synchronization errors. An administrator associated with the service provider computer implementing the features described herein may specify the minimal matching comparison to be utilized for various media content to create more stringent or less stringent matching and data point gathering operations. In accordance with at least one embodiment, an edit distance algorithm may be utilized with some threshold number of operations, specified by an administrator of the synchronization feature described herein, to identify data points for comparing the detected subtitle cue and the audio to text file. For example, an edit distance algorithm with a threshold of 4 operations may be utilized to find portions of the strings between the detected subtitle text and the audio to text file for use in identifying synchronization errors. The process 500 may conclude at 512 by modifying metadata for the subtitle file based on the identified one or more synchronization errors. In embodiments, the metadata for the subtitle file may identify when and how long a subtitle cue and corresponding text display for media content. The metadata may be modified by the computer system by updating the subtitle cues and other data to better synchronize the text and the corresponding audio for media content.

In FIG. 6, the process 600 may begin by extracting a portion of a subtitle file associated with media content based on a length of text and duration of the portion indicated by the subtitle cues for the portion at 602. In embodiments, the subtitle cue timestamp information or time information indicates when the corresponding subtitle text displays and ceases to display for a portion of audio of media content. In identifying the synchronization errors for media content should the subtitle and audio for the media content be synchronized, the text contained in an extracted portion of the subtitle file should match the text of the audio to text file that is generated from the speech to text algorithm. The process 600 may include generating an audio to text file for the portion by using a speech to text algorithm at 604. In embodiments, the speech to text algorithm converts the audio of a portion/all of the media content into text format. The process 600 may include generating a detected subtitle text file based on the extracted portion of the subtitle file, the audio to text file, and an edit distance algorithm at 606. The detected subtitle text file represents the text most similar to the text of the audio to text file using the edit distance algorithm to find the string that corresponds to the subtitle text of the extracted portion that needs the least amount of operations to match the text of the audio to text file.

The process 600 may include identifying one or more synchronization errors for the media content based on the time stamp information associated with the audio to text file as identified in the speech to text algorithm conversion operation and the subtitle cues for the detected subtitle text file at 608. In embodiments, the synchronization module 730 may compare the start time of each detected subtitle cue within the detected subtitle text file to the start time of the correspond words in the audio to text file to find the offset for each associated subtitle cue. The process 600 may conclude at 610 by classifying the one or more synchronization errors based on the differences between the time stamp information associated with the audio to text file and the subtitle cues for the detected subtitle text file. In embodiments, the classifications may include a classification indicating that the subtitle and audio are synchronized; a classification indicating that a constant offset exists between the audio and the subtitles in a uniform manner; a drift classification that identifies that the subtitle cues are offset by an increasing/decreasing time intervals as time progresses for a given media content; a classification for an offset and drift combination; or an other issue classification for errors that do not fall within the other four classifications.

FIG. 7 illustrates an example architecture for implementing the synchronization identification feature, in accordance with at least one embodiment. In architecture 700, one or more users 702 (e.g., customers, users, consumers, etc.,) may utilize user computing devices 704(1)-(N) (collectively, user devices 704) to access a browser application 706 or a user interface (UI) accessible through the browser application 706, via one or more networks 708 to request content including media content such as movies, films, TV shows, or streaming content. The "browser application" 706 can be any browser control or native application that can access and display a network page or other information such as a user interface of a native software application for enabling the selection or interaction of content. A native software application may include an application or program that has been developed for use on a particular platform (such as an operating system) or a particular device (such as a particular type of mobile device or user device 704). In embodiments, the user device 704 may include one or more components for enabling the user 702 to interact with the browser application 706.

The user devices 704 may include at least one memory 710 and one or more processing units or processor(s) 712. The memory 710 may store program instructions that are loadable and executable on the processor(s) 712, as well as data generated during the execution of these programs. Depending on the configuration and type of the user devices 704, the memory 710 may be volatile (such as random access memory (RAM)) and/or non-volatile (such as read-only memory (ROM), flash memory, etc.). The user devices 704 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 704. In some implementations, the memory 710 may include multiple different types of memory, such as static random access memory (SRAM), dynamic random access memory (DRAM), or ROM.

Turning to the contents of the memory 710 in more detail, the memory 710 may include an operating system and one or more application programs or services for implementing the features disclosed herein. Additionally, the memory 710 may include one or more modules for implementing the features described herein including the synchronization module 730.

The architecture 700 may also include one or more service provider computers 714 that may, in some examples, provide computing resources such as, but not limited to, client entities, low latency data storage, durable data store, data access, management, virtualization, hosted computing environment or "cloud-based" solutions, electronic content performance management, etc. The service provider computers 714 may implement or be an example of the service provider computer(s) described herein with reference to FIGS. 1-4 and throughout the disclosure. The one or more service provider computers 714 may also be operable to provide site hosting, computer application development, and/or implementation platforms, combinations of the foregoing, or the like to the one or more users 702 via user devices 704.

In some examples, the networks 708 may include any one or a combination of many different types of networks, such as cable networks, the Internet, wireless networks, cellular networks, and other private and/or public networks. While the illustrated examples represents the users 702 communicating with the service provider computers 714 over the networks 708, the described techniques may equally apply in instances where the users 702 interact with the one or more service provider computers 714 via the one or more user devices 704 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 714 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 714 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 714 may be in communication with the user device 704 via the networks 708, or via other network connections. The one or more service provider computers 714 may include one or more servers, perhaps arranged in a cluster or as individual servers not associated with one another.

In one illustrative configuration, the one or more service provider computers 714 may include at least one memory 716 and one or more processing units or processor(s) 718. The processor(s) 718 may be implemented as appropriate in hardware, computer-executable instructions, firmware, or combination thereof. Computer-executable instruction or firmware implementations of the processor(s) 718 may include computer-executable or machine-executable instructions written in any suitable programming language to perform the various functions described when executed by a hardware computing device, such as a processor. The memory 716 may store program instructions that are loadable and executable on the processor(s) 718, as well as data generated during the execution of these programs. Depending on the configuration and type of the one or more service provider computers 714, the memory 716 may be volatile (such as RAM) and/or non-volatile (such as ROM, flash memory, etc.). The one or more service provider computers 714 or servers may also include additional storage 720, which may include removable storage and/or non-removable storage. The additional storage 720 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 716 may include multiple different types of memory, such as SRAM, DRAM, or ROM.

The memory 716, the additional storage 720, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 716 and the additional storage 720 are all examples of non-transitory computer storage media. Additional types of non-transitory computer storage media that may be present in the one or more service provider computers 714 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 714. Combinations of any of the above should also be included within the scope of non-transitory computer-readable media.

The one or more service provider computers 714 may also contain communication connection interface(s) 722 that allow the one or more service provider computers 714 to communicate with a data store, another computing device or server, user terminals, and/or other devices on the networks 708. The one or more service provider computers 714 may also include I/O device(s) 724, such as a keyboard, a mouse, a pen, a voice input device, a touch input device, a display, speakers, a printer, etc.

Turning to the contents of the memory 716 in more detail, the memory 716 may include an operating system 726, one or more data stores 728, and/or one or more application programs or services for implementing the features disclosed herein including the synchronization module 730. In accordance with at least one embodiment, the synchronization module 730 may be configured to at least generate an object oriented data object from a subtitle file, extract a portion of the subtitle file, generate an audio to text file using a speech to text algorithm for the portion of the subtitle file, use an edit distance algorithm and a certain number gram comparison of the portion of the subtitle file to the audio to text file, identify one or more synchronization errors between the audio and subtitles of media content using the portion of the subtitle file and the speech to text algorithm, and modify metadata for the subtitle file to correct any identified errors as described herein. In embodiments, the synchronization module 730 may generate and transmit reports of the identified errors to the user device 704 via networks 708 for further processing.

Figure 8:
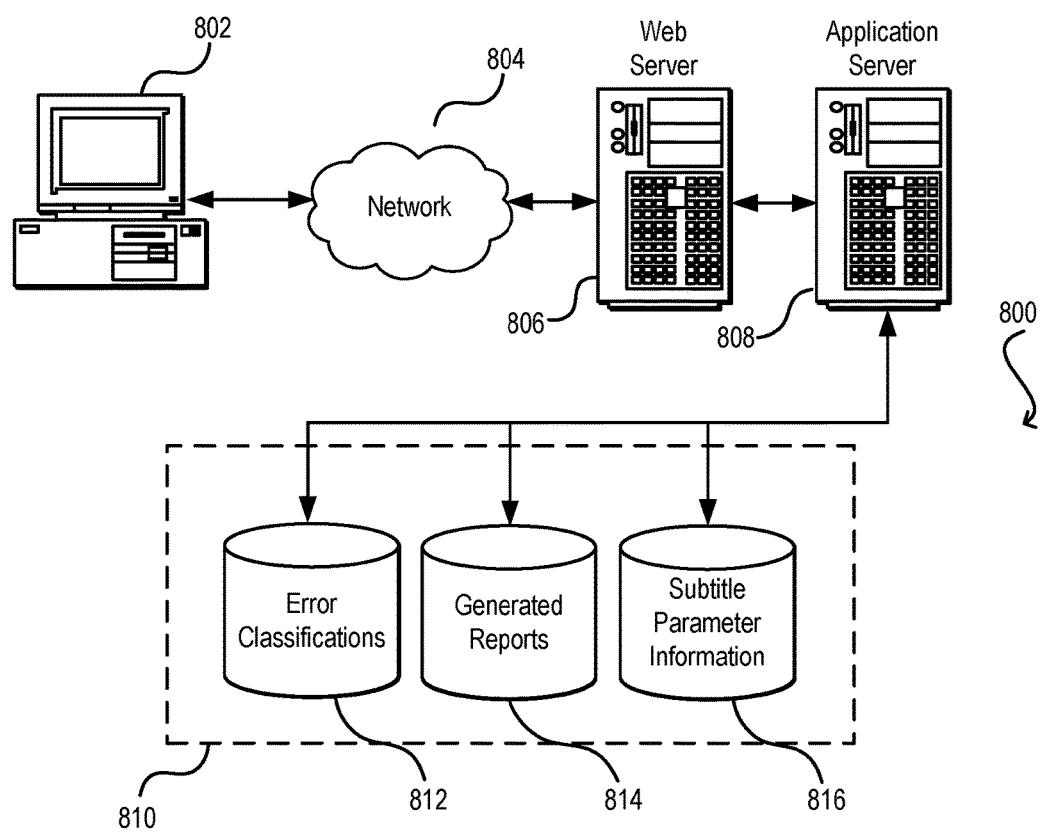
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing error classifications 812 and subtitle parameter information 816, which can be used to update classifications of types of errors identified by the synchronization identification feature and update the length of text and duration of subtitle cues for various error identification implementations. The data store also is shown to include a mechanism for storing generated reports 814, which can be used for reporting, analysis, or other such purposes associated with the synchronization identification features described herein. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
obtaining, by a computer system, a subtitle file for media content that includes metadata that indicates subtitle cues for the media content;
extracting, by the computer system, a portion of the subtitle file that represents audio for the media content based at least in part on a first length of text associated with a subtitle cue of the subtitle cues of the subtitle file and a second length of a duration of the subtitle cue of the subtitle file;
generating, by the computer system, an audio to text file using the extracted portion of the subtitle file and a speech to text algorithm;
generating, by the computer system, a detected subtitle text file based at least in part on the extracted portion of the subtitle file, the audio to text file, and an edit distance algorithm;
identifying, by the computer system, one or more synchronization errors in the audio for the media content associated with the extracted portion of the subtitle file based at least in part on time stamp information associated with the audio to text file and the subtitle cues for the detected subtitle text file; and
modifying, by the computer system, the metadata for the subtitle file of the media content based at least in part on the identified one or more synchronization errors.

2. The computer-implemented method of claim 1, further comprising classifying the one or more synchronization errors into one or more categories based at least in part on the time stamp information associated with the audio to text file and the subtitle cues for the detected subtitle text file.

3. The computer-implemented method of claim 2, wherein the one or more categories comprise an in-synchronization classification, an offset classification, a drift classification, an offset and drift classification, or an other issue classification.

4. The computer-implemented method of claim 3, further comprising generating a report that identifies the other issue classification for the media content.

5. A non-transitory computer-readable storage medium storing computer-executable instructions that, when executed by a computer system, configure the computer system to perform operations comprising:
extracting a portion of a subtitle file associated with media content based at least in part on a first length of text associated with a subtitle cue of the portion of the subtitle file and a second length of a duration of the subtitle cue of the portion of the subtitle file;
generating an audio to text file using the extracted portion of the subtitle file and a speech to text algorithm;
generating a detected subtitle text file based at least in part on the extracted portion of the subtitle file, the audio to text file, and an edit distance algorithm;
identifying one or more synchronization errors between audio for the media content and subtitles for the media content associated with the extracted portion of the subtitle file based at least in part on time stamp information associated with the audio to text file and the subtitle cue for the extracted portion of the subtitle file; and
classifying the one or more synchronization errors into one or more categories based at least in part on differences between the time stamp information associated with the audio to text file and the subtitle cue for the extracted portion of the subtitle file.

6. The non-transitory computer-readable storage medium of claim 5, wherein the operations further comprise modifying metadata for the subtitle file of the media content based at least in part on the identified one or more synchronization errors.

7. The non-transitory computer-readable storage medium of claim 5, wherein the operations further comprise generating a data object using the subtitle file.

8. The non-transitory computer-readable storage medium of claim 7, wherein the data object comprises an agnostic object oriented data object.

9. The non-transitory computer-readable storage medium of claim 5, wherein extracting the portion of the subtitle file includes dividing all subtitle cues for the subtitle file into a first number of proportionate intervals.

10. The non-transitory computer-readable storage medium of claim 5, wherein the subtitle cue further comprises a first time point associated with when the subtitles will be presented during presentation of the media content and a second time point associated with when the subtitles will no longer be presented during presentation of the media content.

11. The non-transitory computer-readable storage medium of claim 5, wherein an administrator specifies the first length and the second length.

12. The non-transitory computer-readable storage medium of claim 5, wherein the operations further comprise combining subtitle text of the subtitle file for the media content into one string.

13. The non-transitory computer-readable storage medium of claim 12, generating the detected subtitle text file includes parsing the one string of the subtitle text into a plurality of strings of a third length that corresponds to the extracted portion of the subtitle file.

14. A computer system comprising:
a memory configured to store computer-executable instructions; and
a processor in communication with the memory configured to execute the computer-executable instructions to at least:
extract a portion of a subtitle file associated with media content based at least in part on a first length of text associated with a subtitle cue of the portion of the subtitle file and a second length associated with a duration of the subtitle cue of the portion of the subtitle file;
generate an audio to text file using the extracted portion of the subtitle file and a speech to text algorithm;
generate a detected subtitle text file based at least in part on the extracted portion of the subtitle file, the audio to text file, and an edit distance algorithm;
identify one or more synchronization errors between audio for the media content and subtitles for the media content associated with the extracted portion of the subtitle file based at least in part on time stamp information associated with the audio to text file and the subtitle cue for the extraction portion of the subtitle file; and classify the one or more synchronization errors into one or more categories based at least in part on differences between the time stamp information associated with the audio to text file and the subtitle cue for the extracted portion of the subtitle file.

15. The computer system of claim 14, wherein the time stamp information identifies a number that corresponds to a time period for each word included in the subtitle file as detected by the speech to text algorithm.

16. The computer system of claim 14, wherein the edit distance algorithm selects one or more words in a first string of the extracted portion of the subtitle file to match to a second string of the audio to text file based at least in part on a minimum distance between the one or more words of the first string and the second string.

17. The computer system of claim 14, wherein identifying the one or more synchronization errors between the audio for the media content and the subtitles for the media content associated with the extracted portion of the subtitle file is further based at least in part on a matching of a first number of words included in the extracted portion of the subtitle file and the first number of the words in the audio to text file.

18. The computer system of claim 17, wherein identifying the one or more synchronization errors between the audio for the media content and the subtitles for the media content associated with the extracted portion of the subtitle file ignores mismatched words between the extracted portion of the subtitle file and the words in the audio to text file.

19. The computer system of claim 14, wherein identifying the one or more synchronization errors between the audio for the media content and the subtitles for the media content associated with the extracted portion of the subtitle file.

20. The computer system of claim 14, wherein the processor is further configured to modify metadata associated with the subtitle file based at least in part on the one or more synchronization errors, the metadata identifying subtitle cues for the media content.

* * * * *